Figure 1:
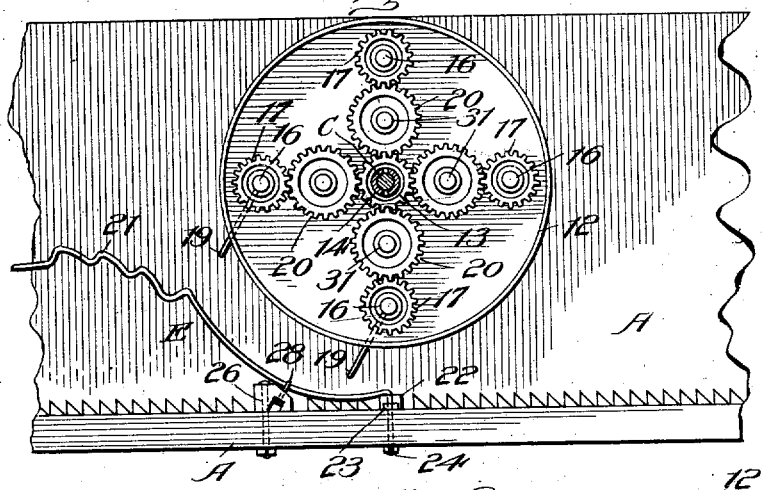

J. E. HILL & W. W. BROWER.

GRAIN OR SEED SEPARATING DEVICE.

APPLICATION FILED JULY 22, 1905.

12,891. Reissued Dec. 1, 1908.

Witnesses

Edwin L. Bradford

N. Curtis Lammond

Inventors

James E. Hill

William W. Brower

By N. H. Bliss

Attorney

THE NORRIS PETERS CO., WASHINGTON, D. C.

UNITED STATES PATENT OFFICE.

JAMES EDWARD HILL, OF PEORIA, ILLINOIS, AND WILLIAM WALLACE BROWER, OF INDIANAPOLIS, INDIANA, ASSIGNORS, BY MESNE ASSIGNMENTS, TO THE SATTLEY STACKER COMPANY, OF INDIANAPOLIS, INDIANA, A CORPORATION OF MAINE.

GRAIN OR SEED SEPARATING DEVICE.

No. 12,891. Specification of Reissued Letters Patent. Reissued Dec. 1, 1908.

Original No. 696,336, dated March 25, 1902, Serial No. 31,485. Application for reissue filed July 22, 1905. Serial No. 270,877.

*To all whom it may concern:*

Be it known that we, JAMES EDWARD HILL and WILLIAM WALLACE BROWER, citizens of the United States, and formerly residents of Meservey, in the county of Cerro Gordo and State of Iowa, and now residing, respectively, at Peoria, in the county of Peoria and State of Illinois, and Indianapolis, in the county of Marion and State of Indiana, have invented a new and Improved Grain or Seed Separating Device, of which the following is a full, clear, and exact description.

The invention relates to a grain and seed separating device combined with a threshing mechanism, adapted to act on the threshed material, in a manner hereinafter explained, for the rapid and thorough separation of grain or seed from the straw.

The purpose of the invention is to thoroughly loosen the mass of threshed material, sub-dividing the straw of which it is mainly composed into a great number of successive small bodies or wisps, thereby allowing the grain or seed to readily separate and fall down from the straw. To this end there is combined with the threshing mechanism, and at the rear or delivery side thereof, a rotary separating cylinder carrying a series of forks arranged to penetrate endwise and downward through the mass of straw to the level of the bottom of the threshed material, and having means whereby they are maintained in positions substantially transverse or crosswise to the path of the straw as it comes from the threshing mechanism, while the speed at which the separating cylinder runs causes such forks to effect the said subdividing of the straw mass by tearing away or removing successive small portions of it.

A further purpose of the invention is to cause an agitation of the straw while it is being thus sub-divided, to promote the separation of the grain or seed, which is accomplished by deflecting means in the path of the sub-divided bodies of the straw through which deflecting means the grain or seed may pass while the said bodies of straw are given a vertical agitation or movement. A means for this latter purpose consists in risers of spring-rod material so situated that the bodies of straw will be impelled against them by the cylinder forks. The extent of separation is further increased by the peculiar shape of the risers and by giving them a vibratory movement, as hereinafter explained.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
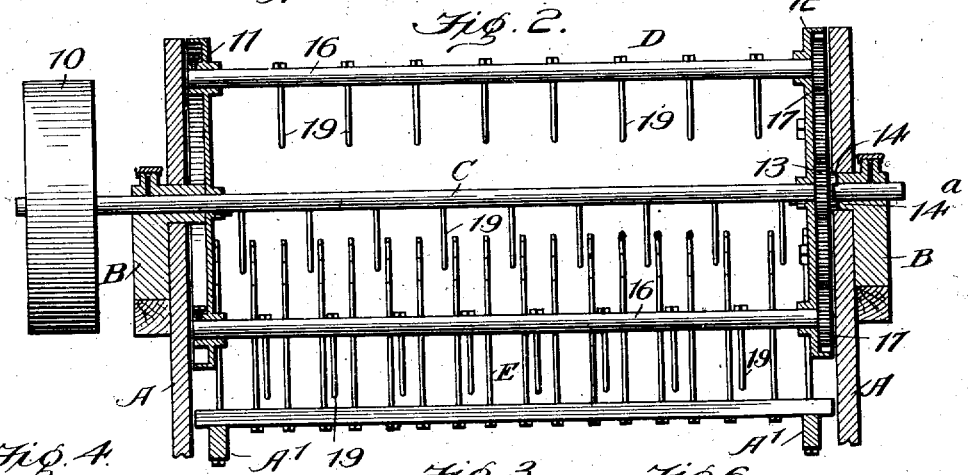
Figure 4:
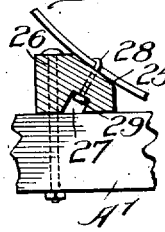
Figure 5:
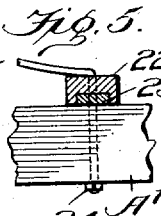
Figure 3:
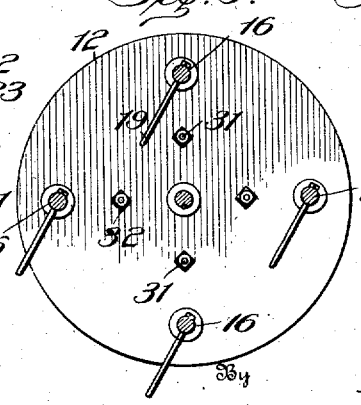
Figure 6:
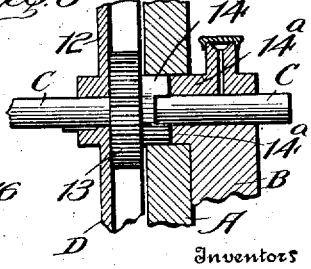

Figure 1 is a vertical section through the cylinder-shaft, showing the gear end of the cylinder in elevation and illustrating the grain-table and a riser in side elevation. Fig. 2 is a longitudinal vertical section through the cylinder and a transverse section through the grain-table. Fig. 3 is a transverse section through the separating-cylinder, and Figs. 4 and 5 are detail views showing the manner in which the risers are attached to the grain-table, and Fig. 6 is a sectional view of a portion of the gear end of the separating-cylinder and a vertical section through the bearing for the cylinder-shaft at the gear end of the cylinder.

A represents the frame, in which a straw-table A′ is mounted to move with an agitating or vibratory motion, and said table may be of the usual construction and operated in the customary manner. A shaft C is mounted in bearings B, carried by the frame and having extensions which project inward through openings in the side boards of the frame, and said shaft is provided at one end with a driving-pulley 10. The shaft C also carries a cylinder D, located between the side boards of the frame, and the heads 11 and 12 of this cylinder are keyed or otherwise firmly secured to the shaft C. Preferably each head is provided with an outwardly-extending marginal flange, as shown in Figs. 1 and 2.

In the further construction of the cylinder D shafts 16 extend from one head of the cylinder to the other and are journaled in said heads. Where the shafts 16 extend out through the head 12 of the cylinder D, gear-wheels 17 are secured, as shown in Figs. 1 and 2, and these gear-wheels are of equal diameter to the diameter of a gear 13, loosely mounted upon the corresponding end portion of the main cylinder-shaft C, and the gears 17 are provided with the same number of teeth as the gear 13. The gear 13 is held stationary, preferably by providing said gear 13 with a hub 14, having recesses therein, as shown in Fig. 1, which recesses receive extensions 14[a] from the bearings B adjacent to the cylinder-head 12, as is clearly shown in Fig. 6.

The shafts 16 are shown as four in number, although their number may be varied, and each of said shafts is provided with teeth 19, secured thereto in any suitable or approved manner. These teeth 19 may be given any desired inclination by turning the shafts 16, which is accomplished through the medium of the aforesaid gears 17. When the shafts 16 have been suitably adjusted, said teeth are held in their adjusted position by placing gears 20 between the stationary gear 13 and the outer or shaft gears 17, and the gears 20 are of suitable size to mesh equally with the stationary and the shaft gears. Thus as the cylinder is revolved the gears 17 and 20 turn around the stationary gear 13, and the teeth-carrying shafts 16 are given motion.

The straw taken up and agitated by the cylinder D is dropped upon a series of risers E, which are located below and at the rear of the cylinder, as shown in Fig. 1. These risers are arranged in a transverse row upon the grain-table A′ and are carried by said table. Any desired number of risers E may be employed, and they are placed at suitable distances apart. These risers are made of spring material, preferably stout wire of suitable gage, and each riser at its bottom portion has its upper surface concaved, as is particularly shown in Fig. 1, and the free ends of the risers are fluted or corrugated to form a series of teeth 21, which teeth incline in direction of the rear of the machine or the delivery end of the riser, as is also shown in Fig. 1. These teeth 21 serve to jog the straw in a rearward direction and also tend to prevent the straw falling back on the body portions of the risers.

The forward ends of the risers are passed through a beam 22, which beam is attached to the sills of the grain-table A, and the forward ends of the risers are likewise passed through a metal plate 23, inserted in the bottom portion of the beam 22, whereby the beam is strengthened and the attachment of the risers to the table is rendered more secure. The forward ends of the risers E pass through the sills of the table or through the bed of the table, and at the forward extremity of each riser a nut 24 is provided, having bearing against the bottom of the table A′, as shown in Figs. 1 and 5.

Where the body portion of a riser curves upward, the risers bear upon the inclined face 25 of a second rear beam 26, carried by the table A′, as shown in Figs. 1 and 4. This beam 26 is bolted to the table and is provided with a longitudinal recess 27 in its under face, and yokes or clips 28 are passed over the risers and into the beam 26, the inner ends of the yokes or clips extending in the slot or recess 27, at which point the clips or yokes are provided with nuts 29, as is particularly shown in Fig. 4.

It has been heretofore stated that the intermediate gears 20 hold the teeth or forks 19, carried by the shafts 16 of the cylinder D, in adjusted position. Therefore when the shafts 16 are to be turned so as to adjust the angle of the teeth or forks 19 the intermediate gears 20 must be removed from the head 12 of the cylinder. To this end the intermediate gears 20 are mounted to turn on pins 31, (shown in Fig. 3,) which are carried through the head 12, and at their inner ends are provided with suitable nuts 32.

By means of the gearing carried by the head 12 of the cylinder D the shafts 16, carrying the forks or teeth 19, revolve in such manner that the teeth or forks 19 at all times during the revolution of the said shafts will remain in their fixed or adjusted positions.

The specific operation of the risers in connection with the cylinder is that they cause the free passage of all straw to the rear of the machine without clogging, and the risers impart a vibrating motion to the web of straw as it leaves the cylinder, thus causing the threshed grain to part from the straw. As an especial feature it may be mentioned that since the risers are constructed of round steel rods and extend rearward to some distance while the web of straw is passing over them they act upon the straw with a double motion, having the motion of the straw-table and also the spring or vibration of the material of which the risers are constructed.

The speed at which the cylinder runs and the fact that it carriers four or more sets of forks, each set of which passes a given point once during a revolution of the cylinder, produce a great reduction in volume of the straw presented to the cylinder. Presuming the web of straw delivered to the forks of the cylinder by the motion of the straw-table to be ten inches in thickness, the web would by being brought in contact with the cylinder be reduced at least six times less that volume, and, as before mentioned, the straw by being thrown by the cylinder upon the spring-risers in a thin web, and through the motion imparted to the straw by the risers, an almost perfect separation is obtained. The fork-carrying shaft by remaining in a fixed position and the forks in said shaft always remaining in a downwardly-extending position render the wrapping of the straw or its tendency to a return movement practically an impossibility.

Through the employment of a rotary motion in a forked cylinder much better results are obtained than is possible when a crank motion is used.

We are aware of the fact that it has been heretofore proposed to combine with a threshing cylinder a sheet metal perforated straw table in rear of such cylinder, together with a cylinder or drum, also in rear of the threshing cylinder and above the said sheet metal table, this rear cylinder or drum carrying a series of relatively wide imperforate grain stopping plates or boards each of which on its lower edge was to be provided with a series of shallow notches or serrations, the plates or boards in full sized apparatus to be about twenty-four inches wide and the serrations or notches to be about three-quarters of an inch in depth; this drum or cylinder and its plates or check boards being so arranged as to always leave an open space between the points of the serrations and the sheet metal grain-table. Mechanisms of the sort so proposed are typified in Patent No. 345,695, to I. D. Heebner, dated July 20, 1886, and we desire it to be understood that we do not claim as of our invention any of the features of structure or mode of operation incident to such mechanisms. But the differences of structure and the differences in the mode of operation which characterize our mechanism will be readily understood upon a comparison with the earlier ones referred to and illustrated in the said Heebner patent. In our case there are present relatively elongated forks or teeth, each several inches in length and long enough to pass through the web of straw to the bottom plane thereof, in contrast with shallow indentations capable of penetrating only to a distance of less than an inch from the top plane of the straw mass. Moreover, in our machine these forks or teeth are so constructed and arranged that they do not act to compact the straw or press downward on the whole upper surface thereof across the machine, as would be the case in the earlier proposed machines referred to. The pressing or packing down of the straw mass is the very thing which must be avoided in attempting to have the loose grain berries escape therefrom by vertical dropping. The more the straw mass is compacted by pressure on the top, as from a downward moving board or plate, the less will be the possibility for the grain berries to dislodge themselves and trickle downward. Our aim is to retain the straw mass in as light and loose a condition as possible and to pick off, a few at a time, the straws from the front edge of the mass moving from the threshing cylinder and to carry them away from the said mass, without any severe packing or pressing downward from the top. We loosen or separate the straws rather than render the mass more compact, and the grain berries, losing their support, drop downward through the straw table.

It will be seen that the lower ends of the forks or teeth descend so that at times their lower ends are in or approximately in the horizontal planes of the top edges of the straw supports at some transverse line or lines of the path of the straw. For instance, as shown Fig. 1, the lower ends of the forks or teeth 19 descend to the horizontal plane of the upper surfaces of the forward heel ends of the straw supporting risers E, and consequently the said forks penetrate to the bottom of the straw mass as it is passing the transverse line of the said forward ends of the said supports. As a result, the straws, without being packed downward, are picked off from the rearward moving web a few at a time at this transverse line where the elongated teeth penetrate clear to the bottom of the web.

We are also aware of the fact that it has been proposed to employ isolated and elongated teeth or forks secured to shafts mounted in a drum or cylinder and combined with gearing carried by the cylinder which insures that the teeth shall always maintain fixed positions relative to the vertical and to the horizontal even while they are bodily rotating with the cylinder and around the axis of the latter, and we do not claim such a device broadly considered and irrespective of other parts or irrespective of its relative position. Mechanisms of the sort last referred to are illustrated in Patent No. 506,422, to R. E. Dorton, for a band cutter and feeder, dated October 10, 1893. But in a band cutter and feeder the purpose aimed at and the result to be obtained are entirely different from those which characterize our construction. In the former the aim is merely to advance the material of a newly cut gavel or bundle to the threshing cylinder. The rotating teeth are, in such a mechanism, not used as one of the factors to effect the vertical dropping downward of the grain berries from the straw. In the band cutters and feeders they are combined with stationary, flat, imperforate floors. We believe ourselves to be the first to have utilized a straw picking and advancing mechanism of this sort in conjunction with a vibrating straw support having vertical grain passages, the two parts being related in such way that the grain berries will be permitted to freely drop downward in the open space formed when a few wisps of straw are rapidly torn away from the mass advancing from the threshing cylinder. The rapid vibratory movements imparted to the straw and the berries on the table are as essential for successful work as is the action of the picking teeth or forks.

Having thus described our invention, we claim as new and desire to secure by Letters Patent,—

1. In a grain and seed separating device, a cylinder mounted to rotate, shafts mounted to turn in the said cylinder, independent driving mechanism for the cylinder and the shafts carried thereby, a vibratory grain table, and a series of risers carried by said table, the said risers consisting of spring rod material having their body portions curved downward and forward, the upper surface of the body being concaved, and the free end portion of each riser being provided with a series of teeth, supports secured to said table, and fastening devices attached to one of the supports and engaging with the said risers, the forward end portions of the risers being carried through the forward support and through the table, as set forth.

2. In a threshing machine, the combination of a separating cylinder at the rear of the threshing mechanism, a series of forks carried by said cylinder and arranged substantially transverse to the path taken by the straw when it is traveling from the threshing mechanism, the teeth of which forks are vertically elongated and adapted to penetrate to the level of the bottom of the straw and without packing it, a vibratory grain separating straw support below the separating cylinder, means for rotating the forks bodily in circular paths with the said cylinder around its axis, and means for maintaining the forks at a substantially uniform inclination to the straw path while they are operating on the straw.

3. In a threshing machine, the combination of a separating cylinder at the rear of the threshing mechanism, a series of forks carried by the cylinder and arranged substantially transverse to the path taken by the straw when traveling from the threshing mechanism, the teeth of which forks are vertically elongated, a vibratory grain separating support below the cylinder, means for rotating the cylinder and maintaining the forks at a substantially uniform inclination, and means for deflecting upward and agitating the straw as it is impelled by the said forks, said means having vertical passage-ways for the escape of the grain.

4. In a threshing and separating machine, the combination with a grain separating straw-supporting table upon which is formed a web-like stream of threshed straw, of a rotary separator having straw-engaging teeth or fingers held continuously at substantially the same inclination to the horizontal, and arranged to penetrate the said web-like stream of straw without tending to pack it and to separate small masses thereof from the front end of the stream, whereby the latter will be broken up and reduced in thickness, and the grain berries permitted to drop therethrough.

JAMES EDWARD HILL.
WILLIAM WALLACE BROWER.

Witnesses to the said James E. Hill:
ED. HUDSON,
R. D. ANDREW.

Witnesses to the said William W. Brower:
CHARLES S. HALL,
HOMER R. BARKER.